United States Patent

Bichsel

[11] Patent Number: 6,042,860
[45] Date of Patent: Mar. 28, 2000

[54] DEVICE AND METHOD FOR PUFFING FOODSTUFFS

[76] Inventor: Rudolf Bichsel, 29 rue du Vieil-Armand, F-68500 Guebwiller, France

[21] Appl. No.: 08/987,080

[22] Filed: Dec. 9, 1997

Related U.S. Application Data

[63] Continuation of application No. PCT/EP96/02327, May 30, 1996.

[51] Int. Cl.[7] .................................. A23P 1/14; A23L 1/18
[52] U.S. Cl. .......................... 426/281; 426/559; 426/621; 426/445; 426/447; 426/450; 426/507; 426/511; 99/323.4; 99/323.9; 99/323.11
[58] Field of Search .................................... 426/281, 559, 426/621, 445, 447, 450, 507, 511; 66/323.4, 323.9, 323.11

[56] References Cited

U.S. PATENT DOCUMENTS

| | | |
|---|---|---|
| 2,026,734 | 1/1936 | Ferguson .................................. 99/323.4 |
| 3,512,989 | 5/1970 | Smith ...................................... 99/323.4 |
| 3,908,034 | 9/1975 | Paugh ...................................... 426/449 |
| 4,878,422 | 11/1989 | McCullough et al. ................... 99/323.4 |

FOREIGN PATENT DOCUMENTS

| | | |
|---|---|---|
| 0061229 | 1/1985 | European Pat. Off. . |
| 0437295 | 7/1991 | European Pat. Off. . |
| 1692697 | 2/1973 | Germany . |

*Primary Examiner*—Milton Cano
*Attorney, Agent, or Firm*—Harness, Dickey & Pierce, P.L.C.

[57] ABSTRACT

A device for puffing foodstuff comprises an upright puffing reactor having a vessel for receiving foodstuff therein. The vessel has a wall provided with a plurality of openings. A chamber surrounds the vessel. The vessel has no openings in an upper section. A first pressurized heat-carrying agent is supplied to the chamber under a first pressure, and the agent flows from the chamber through the plurality of openings uniformly through the foodstuff disposed within the vessel. Shortly before the vessel is opened via an opening mechanism, a second agent having a higher pressure than the first pressure is supplied into the upper section above the foodstuff disposed within the vessel for providing a "propelling charge" behind the foodstuff.

11 Claims, 3 Drawing Sheets

DEVICE AND METHOD FOR PUFFING FOODSTUFFS

RELATED APPLICATIONS

This is a continuation application of international patent application PCT/EP96/02327 filed May 30, 1996, which claims priority of German patent applications 195 21 168.5 and 195 21 243.6 and which is fully incorporated by reference.

BACKGROUND OF THE INVENTION

The invention relates to a device for puffing foodstuffs, especially cereals and pulse, in an upright puffing reactor comprising a vessel that can be closed for receiving the foodstuff as a granular product, further a supply line for introducing a pressurized, heat-carrying agent into the vessel, and an opening mechanism for the abrupt opening of the vessel. The present invention further relates to a method for puffing foodstuffs, especially cereals and pulse, where the foodstuff is processed to the state of a granular product, the product is then placed in a closed, upright vessel, is subjected in the closed vessel to the action of a pressurized, heat-carrying agent in a manner such that when subsequently the vessel is opened, an abrupt pressure reduction occurs, with the product being expelled from the vessel, such that the product is puffed out.

A device and a method of that kind have been known from EP 0 061 229 B1.

The term puffing describes a processing method for cereals and pulse, where the product is steamed and, after release of the pressure, puffed out to form light masses. The product is then sold as puffed wheat, puffed rice, puffed corn, puffed peas, etc.

In the thirties of this century, the respective installations were designed in such a way that the product is introduced into a lying cylinder through a charging box, whereafter the cylinder is closed by a special device. The cylinder is then set to rotate and is heated by gas flames until the pressure in the cylinder has reached a predetermined level. Thereafter steam is introduced into the cylinder until the steam pressure reaches a predetermined value. The steam supply is then shut off, and heating by the gas flames is continued until a pressure of approximately 12 bar prevails inside the cylinder. Now the internal pressure is abruptly released by blowing open and/or opening the door of the cylinder, which is especially designed for this purpose. The product shoots out of the cylinder, and exactly at that moment the product expands and increases its volume so as to form the puffed product. The core of the product had already been softened under the action of the steam, and the high steam pressure of 12 bar already prevails in its interior. At the moment the cylinder is discharged, the outer pressure suddenly disappears, and the high pressure still prevailing inside the grain puffs the grain structure, which means that the grain is expanded to eight times to ten times its original size. Opening the cylinder is accompanied by a gun-like detonation, which also releases corresponding recoil forces. The flap or the closure of the cylinder is designed as an end flap of the lying cylinder, which is exposed to extremely high loads. It often happened that the flap was torn off the cylinder together with the entire mounting mechanism.

Certain further developments then led to installations where the discharge openings were provided at the bottom.

The previously mentioned European Patent Specification No. EP 0 061 229 now comprises an upright, approximately cylindrical vessel which is filled with the product from above and is then closed. In the lower end portion, which also comprises the discharge end, a pressurized, heat-carrying agent is introduced into the vessel via a single line. The pressurized, heat-carrying agent so introduced—in most cases pressurized steam—flows through the product or material in the vessel, thus heating it up to the desired temperature. According to EP 0 061 229 B1, the heating process is continued until a temperature of between 100° and 300° Celsius is reached, whereby a pressure of at least 5 bar is built up. The lower end of the vessel is provided with a discharge line, which is bent off by 90° and which opens into an expansion chamber. Under the selected conditions, the humidity contained inside the product, originating either from the product itself or from a corresponding pretreatment of the product, is likewise heated up, without however vaporizing. When the opening mechanism is opened, the product shoots out of the vessel through the discharge line, and expands in the expansion chamber, i.e. the abrupt pressure reduction also allows the humidity contained in the product to vaporize abruptly, whereby the product is puffed.

The device and the method described in EP 0 061 229 are, however, connected with numerous disadvantages.

The agent which is introduced into the vessel at a temperature of 200° to 300° Celsius is so hot that the product presents a risk of damage or burns.

In addition, it costs a lot of energy to heat water steam up to such high temperatures.

In the lower third of the filled reactor, a lot of condensation occurs with the effect that the product gets excessively wet and that the subsequent expansion process leads to a poor result. In the upper third of the reactor, the product is heated up and wetted insufficiently, which also leads to a poorly puffed product.

EP 0 437 295 A1 discloses a reactor with a perforated vessel received in its interior. The agent (for example water vapor) is permitted to flow from the outside through the perforations and into the product contained in the vessel, and to heat it up.

Now, it is the object of the present invention to improve a device and a method of the before-mentioned kind in such a way as to permit the product to be treated with relatively low temperatures, while achieving an expulsion pressure that normally would require higher temperatures.

SUMMARY OF THE INVENTION

This object is achieved by a device for puffing foodstuffs in that the vessel is provided with a plurality of openings distributed over its periphery. A chamber is provided around the outside of the vessel, to which chamber the pressurized, heat-carrying agent is supplied. The agent flows in a uniform manner from the chamber via the plurality of openings into the vessel and through the foodstuff contained in that vessel. The vessel has no openings in its uppermost section. A second supply line, through which an agent can be introduced at a higher pressure than that of the agent supplied to the chamber opens into the upper end section of the vessel having no openings.

The object is achieved by a method in that the product to be puffed is introduced into a vessel whose periphery is provided with a plurality of openings. The pressurized, heat-carrying agent is applied over the outside of the vessel and flows through said plurality of openings into the product and in uniform distribution through the latter. A pressure, higher than the pressure of the pressurized heat-carrying agent is applied into a product-free area in the uppermost vessel section having no openings, located behind the product, viewed in the direction of discharge of the product. Said higher pressure is applied shortly before said vessel is opened.

This measure provides the notable advantage that an even higher pressure is built up for a short time in the area behind the product, shortly before the device is opened, whereby sort of a higher-pressure "propelling charge" is produced. The higher pressure in the area "behind" the product will of course in part migrate into the product, but since this additional pressure build-up occurs only shortly before the system is opened, this pressure equalization effect will not have proceeded very far at the time of opening. This now provides the possibility, if the pressure agent is one carrying water vapor, to achieve this additional pressure build-up by a further heated-up steam-carrying agent which may then well exhibit temperatures that would be critical for the product. This agent of higher pressure and possibly of higher temperature will essentially come into contact only with the product layer present at the upper end of the upright vessel, and this only for a short period of time, so that there is no substantial risk of impairment to the product. The "propelling charge" has the effect to expel the product from the reactor rapidly, uniformly and completely. The temperature prevailing in the product can be maintained at a desired, relatively low level.

The periphery wall of the vessel is provided with a plurality of openings, and the outside of the vessel is surrounded by a chamber into which the agent is supplied. The agent flows from the chamber through the numerous openings into the vessel, which latter does not have any openings in its upper end section.

By providing these numerous entry openings for the hot agent, distributed over the periphery of the vessel, the agent can enter the vessel in uniform distribution from the outside through the numerous openings, and can penetrate the product simultaneous at many points so that a plurality of heat-exchanging positions are formed. Starting at the numerous openings, a countless number of small flow channels will form so that the direct heat-exchanging surface between the agent flowing in through the numerous openings and the product grains is multiplied compared with the single supply line described before.

This allows the heat to be transmitted to the product in a much shorter period of time, and especially with much better uniformity, while at the same time pressure can build up in the vessel. Correspondingly, it is no longer necessary to have an unnecessarily high temperature gradient between the admitted agent and the grain, which fact already considerably reduces the condensation risk. The considerably quicker and more uniform distribution of the heat results not only in energy savings, but also in time savings. Such a device permits more puffing shots to be effected per unit time. Due to the homogeneous distribution of heat in the expansion chamber a relatively uniformly puffed product is obtained. The bandwidth of product variation is considerably narrower; especially the undesirable extreme cases. Non-puffed product on the one hand and excessively puffed, i.e. broken or crumbled product, on the other hand are largely eliminated. Due to the fact that in order to achieve a given desired product temperature, it is no longer necessary to introduce an agent that has been heated up far beyond that temperature, it is now possible to heat the product much more gently and without the risk of burns.

The fact that no openings are provided in an upper end portion of the vessel causes a product-free agent cushion to build up "behind" the product already in this operating phase, to work as sort of a "base propelling charge". Then, shortly before the reactor is opened, the agent of the higher pressure $p_2$ is additionally supplied to the area of the "base propelling charge" in order to push the product along in front of it when the reactor is opened.

According to another embodiment of the invention, the higher pressure is also applied to the outside of the vessel.

In the case of the device, this is achieved by the fact that the supply line for the agent of the higher pressure is connected with the chamber via a valve.

This feature now presents the considerable advantage that the higher "propelling charge" pressure is not only produced in the area "behind" the product inside the vessel, but is built up also in the chamber surrounding the vessel. Consequently, there exists a pressure gradient between the chamber, that surrounds the vessel, and the area inside the vessel in which the openings are provided and which also contains the product. Now, as the vessel is opened, the agent of the higher pressure is urged from the outside of the vessel out of the chamber, through the openings and into the emptying inner space of the vessel. This on the one hand prevents product particles or product dust from being pressed through the openings during the emptying process, while on the other hand an air cushion can be produced on the inner wall of the vessel so that the product can flow out of the vessel along its inside with relatively little friction. This allows the product to be expelled from the vessel in a relatively gentle way.

According to another embodiment of the invention, the openings are formed as outwardly directed punched holes or as annular channels formed between superimposed ring elements, and the openings in particular are inclined downward in the direction of discharge.

These features act to reinforce the "air-cushion effect" during discharge of the product.

According to another embodiment of the invention, the vessel is heated from the outside.

According to this feature, the device has the outside of the chamber equipped with a heating that may especially take the form of a heating chamber arranged around the chamber, and the heating chamber can be passed by a heating agent.

This feature now presents the advantage that any condensation of the flowing heat-transmitting agents during the start-up phase and during performance of the process can be largely eliminated.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Further features and advantages of the invention are evident from the description below of preferred exemplified embodiments, with reference to the drawings in which.

DETAILED DESCRIPTION OF PREFERRED EMBODIMENTS OF THE INVENTION

Figure 1:
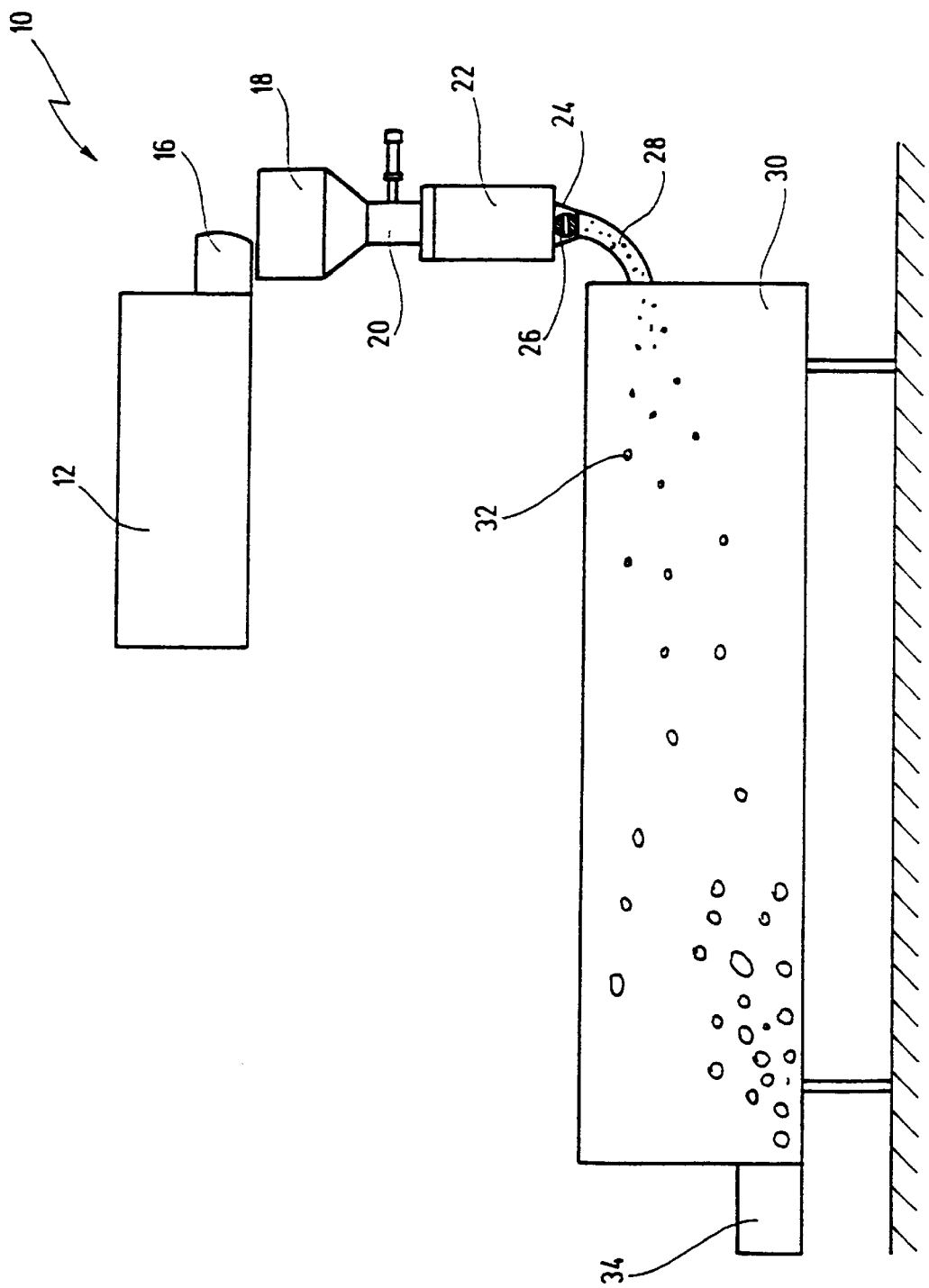
FIG. 1 shows a very schematic side view of a puffing device.

FIG. 1 shows a very schematic view of a device for puffing foodstuffs, generally indicated by reference numeral 10.

The device 10 comprises a heating chamber 12 in substantially horizontal arrangement.

The heating chamber 12 receives and pre-heats the product to be puffed in the form of a processed granular product. The preheating temperature is below 100° Celsius so that the humidity contained in the product will not vaporize.

A discharge section 16 serves to transfer the preheated product into a supply bin 18. The supply bin 18 is provided with an external heat-insulating jacket in order to maintain the temperature of the preheated product.

The lower end of the supply bin 18 is provided with a metering valve, which in its turn is arranged on the upper end of a puffing reactor 22.

The metering valve 20 serves to introduce the corresponding quantity of product to be puffed into the puffing reactor 22, and then the upper end of the puffing reactor is closed.

The lower end of the puffing reactor 22 is provided with an opening mechanism 24, which in the illustrated embodiment contains a ball valve 26.

The opening mechanism 24 is connected via a curved pipe 28 with an expansion chamber 30 into which the product is shot, in substantially horizontal alignment, as the opening mechanism 24 is opened. The product 32 expands during the time of flight, i.e. after it leaves the pipe 28 the liquid contained in the product vaporizes abruptly, thereby blowing up the product so that the desired blown-up or puffed product is obtained. The puffed product can then be discharged from the expansion chamber 30 via a discharge section 34.

Figure 2:
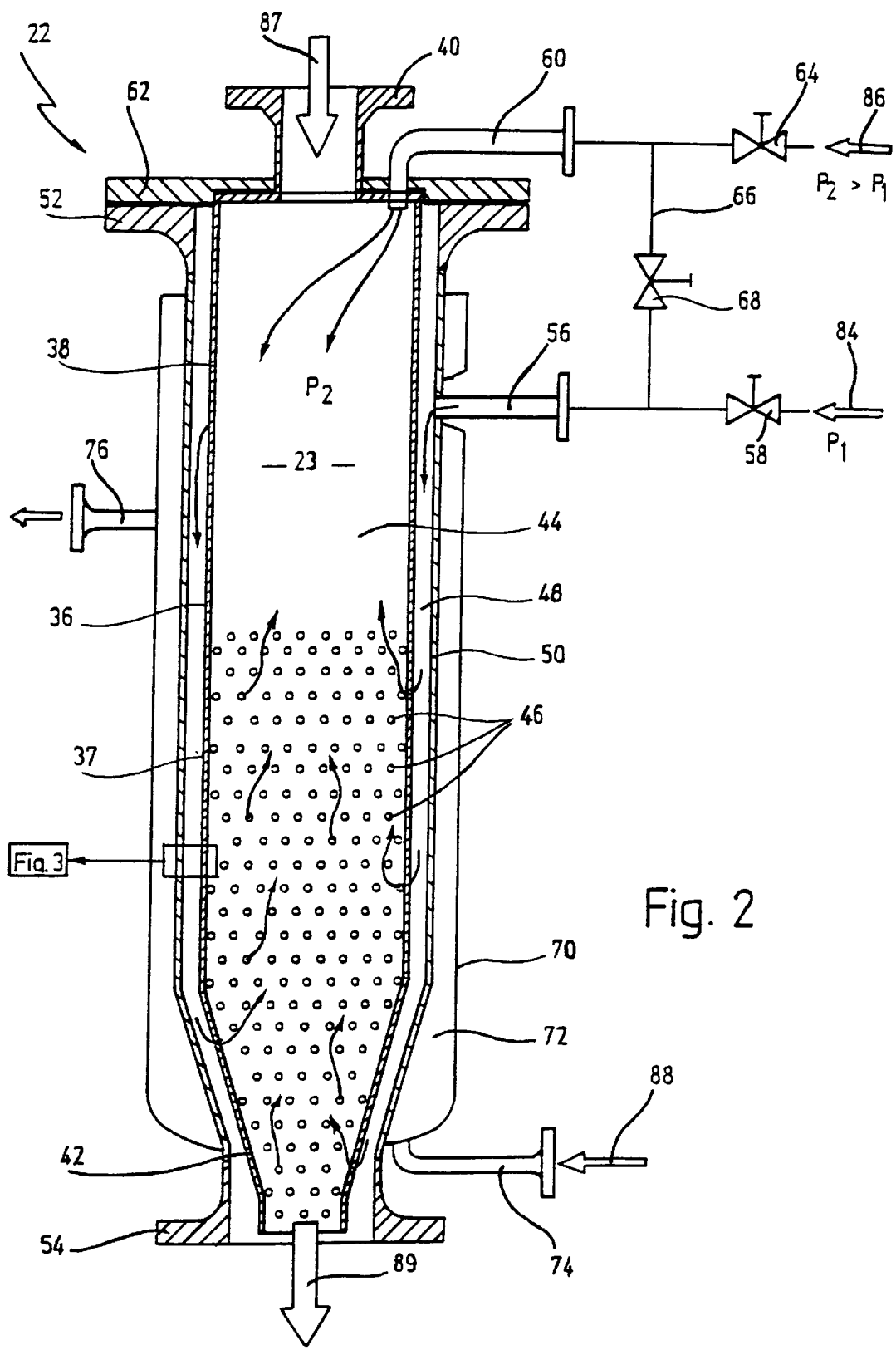
FIG. 2 shows a—partly schematic—longitudinal section through a puffing reactor of the device, in greatly enlarged scale as compared with the representation of FIG. 1.

The puffing reactor 22 as such is illustrated in enlarged scale in FIG. 2, an outer insulating jacket, shown in FIG. 1, being omitted for greater clarity.

Referring now to FIG. 2, the puffing reactor 22 comprises an inner vessel 36 designed in the form of a hollow metal cylinder 38.

The upper end of the hollow cylinder 38 is connected with a pipe end 40, which is flange-mounted to the lower end of the metering valve 20.

The lower end of the hollow cylinder 38 is provided with a conical section 42 whose lower end opens into the opening mechanism 24, i.e. the ball valve 26.

The lower conical section 42 as well as approximately half the height of the hollow cylinder 38 are provided with a plurality of circular openings 46 passing the wall of the hollow cylinder 38.

As illustrated in the embodiment, the openings are provided in a regular perforated-plate pattern, the diameter of the openings 46 being in the range of 1 mm.

The vessel 36 is surrounded by a chamber 48 formed by a jacket 50 being arranged concentrically around the vessel 36. The chamber 48 is therefore constituted by an annular space surrounding the vessel 36.

The upper end of the jacket 50 is provided with a flange 52 connected with a cover plate, which simultaneously forms an upper, tight closure of the chamber 48.

Correspondingly, the lower end of the jacket 50 is provided with a flange 54 by means of which it is flange-mounted to the upper end of the opening mechanism 24, whereby the chamber 48 is tightly closed.

The jacket 50 is provided with a supply line 56 that opens into the chamber 48. An agent 84, being supplied into the chamber 48 via the supply line 56, thus enters initially the annular chamber 48, from where it can enter the inner space 23 of the vessel 36 in uniform distribution, through the numerous openings 46.

The supply line 56 is connected, via a valve 58, with a source—not shown in detail—of the agent 84, for example a water vapor agent at 180° Celsius and at a pressure $p_1$ of approximately 5 to 12 bar.

The cover plate 62 is provided with an additional supply line 60, which is passed through the cover plate 62 and opens into the upper end portion of the inner space 23 of the vessel 36.

The supply line 60 is connected with a source—not shown in detail—of an agent 86, via a valve 64. This agent may again be water vapor, for example at a temperature of 230° Celsius, with the pressure $p_2$ of the agent 86 being higher than the pressure $p_1$ of the agent 84.

The pressure $p_2$ of the agent 86 is preferably in the range of between 15 and 25 bar.

Following the valves 58 and 64—viewed in the direction of flow toward the vessel 36—the supply lines 60 and 56 are connected one with the other by a connection line 66 that can be opened and closed by a valve 68.

An additional heating jacket 70 is provided around the jacket 50 so as to form a heating chamber 72 around the jacket 50. The heating chamber 72 is provided with an inlet 74 and an outlet 76.

A heating agent 88, consisting for example also of a steam-carrying pressurized agent, for example water vapor at 120° to 150° Celsius and 5 bar, can be guided across the heating chamber 72.

According to the illustrated embodiment, all agents introduced are water vapor agents, especially saturated steam, that come from a single source and can be adjusted to the desired pressure and/or the desired temperature via corresponding pressure-reducing valves.

The puffing reactor 22 according to the invention operates as follows:

The heating agent 88 flows through the heating chamber 72.

The inner space 23 of the vessel 36 is charged from the supply bin 18 via the pipe 40 and the metering valve 20 with preheated product in quantities such that the filling level is above that area of the hollow cylinder 38 in which the openings 46 are provided. This means, the filling level is above the uppermost row of the openings 46, but the inner space 23 is not filled completely. In the inner space 23, atmospheric pressure prevails.

With the valves 64 and 58 closed, and the ball valve 26 also in closed condition, the agent 84 at the pressure $p_1$ is permitted to flow into the chamber 48 through the open valve 58. The agent 84 enters from the outside 37 of the vessel 36 through the openings 46 and flows toward the inner space 23 of the vessel 36. There the agent 84 hits upon the product 32 and flows through the latter in upward direction toward the upper end portion 44 of the vessel 36.

During this action, innumerably small flow channels are formed, starting from the opening 46, as illustrated by the arrows in the sectional representation. As the agent 84 flows through the product, heat is transmitted to the product 32, but due to the selected pressure and temperature conditions, the humidity inside the product 32 cannot vaporize.

The process of the agent 84 flowing into and through the product takes approximately 30 to 60 seconds.

Then the valve 58 is closed, the valves 64 and 68 are opened, whereby the agent 86 is allowed to flow in. The agent 86 flows through the supply line 60 into the remaining space above the product in the upper end portion 44 of the hollow cylinder 38, where the pressure $p_1$ has been built up, increasing that pressure to the pressure $p_2$. At the same time, the agent 86 can flow into the chamber 48 through the connection line 66 and the supply line 56. This process takes approximately 12 to 15 seconds.

The agent 86 has a temperature of approximately 230° Celsius and a pressure $p_2$ of 15 to 25 bar.

This period of time is sufficient to build up a pressure $p_2$ in the upper product-free area 44 of the vessel 36, without that pressure migrating notably into the product 32, the product representing a high flow resistance. Inside the chamber 48, the pressure $p_2$ builds up. The small openings 46 also present a flow resistance sufficiently high to prevent the pressure $p_2$ from migrating into the interior of the vessel 36.

At the end of that period of time, the ball valve 26 is abruptly opened—opening time approximately 100 to 500 milliseconds—whereafter the product is expelled by sort of an explosion from the vessel 36 and via the bent pipe 28 into the expansion chamber 30, where atmospheric pressure prevails.

The additionally increased pressure $p_2$ prevailing in the upper product-free area 44 of the vessel 36 serves during this action as sort of an additional "propelling charge" for the product 32, located "behind" the product 32 in the direction of discharge 89.

Figure 3:
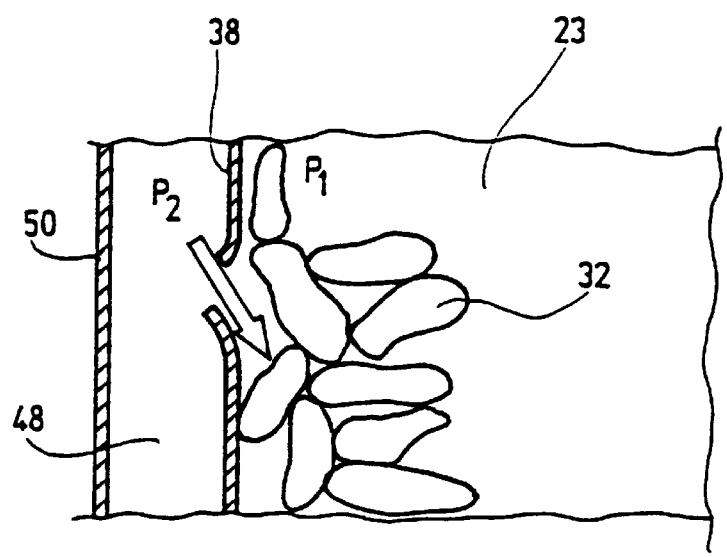
FIG. 3 shows a still further enlarged detail of the area delimited by a rectangle in FIG. 2.

As can be seen particularly well in the enlarged representation of FIG. 3, during this discharge of the product 32 a flow is built up from the chamber 48, where the pressure $p_2$ prevails, toward the inner space 23 of the vessel 36, where the pressure $p_2$ is lowering, whereby the flow acts to urge the product 32 a little away from the inner wall of the hollow cylinder 38. Viewed over the plurality of openings 46, sort of an air jacket or air cushion is built up in the immediate vicinity of the inside of the hollow cylinder 38, which furthers the rapid and no-friction discharge of the product 32.

This effect is further supported by corresponding punched openings 46 facing in downward direction, i.e. in the direction of discharge 89.

Figure 4:
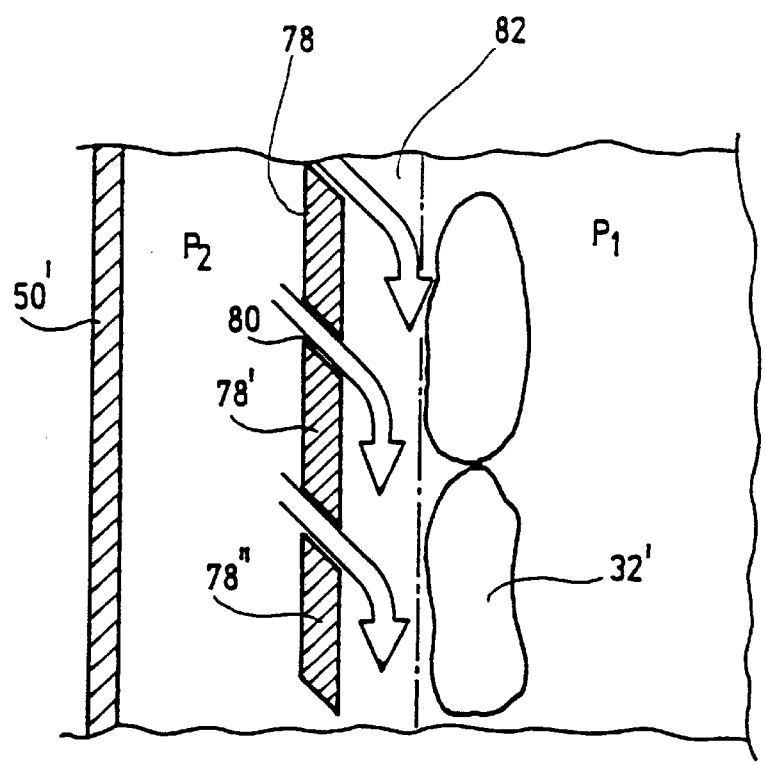
FIG. 4 shows a still further enlarged detail, corresponding to FIG. 3, of another embodiment of the invention.

FIG. 4 shows another embodiment where this effect is achieved even more purposefully.

The hollow cylinder of the vessel is in this case composed of superimposed ring elements 78, 78', 78", forming between them, at the points of contact, downwardly directed annular channels 80. Channels of this kind may also be produced by laser cutting, spark erosion or drilling. During the first process steps, the channels 80 of course also allow the very uniformly distributed entry of the agent 84, but during the discharge step and the equalization of pressure from $p_2$ to $p_1$ they guide the agent so directly into the inner space that sort of an agent cushion 82 is formed on the inside of the annular elements 78, over which the product 32' slides.

The described device 10 is suited for processing all usual cereal products and pulse, with individually adapted pressure and temperature conditions, and provide in each case a very uniformly puffed product.

In the case of the embodiment described before, a vessel provided with openings was used.

I claim:

1. A device for puffing foodstuff, comprising:
   an upright puffing reactor having a vessel for receiving a foodstuff therein, said vessel having a wall provided with a plurality of openings distributed over its periphery, said vessel having no openings in an upper section thereof;
   a chamber formed by an outer jacket provided around said vessel;
   first supply line for introducing a pressurized heat-carrying agent into said chamber under a first pressure, said agent flowing from the chamber through said plurality of openings into said vessel, to thereby uniformly distribute said agent through the foodstuff;
   an opening mechanism disposed at a lower end of said vessel for abruptly opening said vessel; and
   a second supply line for supplying a second agent to said upper section of said vessel at a second pressure higher than said first pressure, said second supply line opening into said upper section of said vessel.

2. The device of claim 1, wherein said second supply line is connected to said chamber via a connection line that can be opened and closed by a valve.

3. The device of 1, wherein an outside of said chamber is provided with a heating jacket.

4. The device of claim 3, wherein said heating jacket defines a heating chamber surrounding said chamber, and a heating agent can be guided through said heating chamber.

5. The device of claim 1, wherein said openings are formed as outwardly directed punched holes.

6. The device of claim 1, wherein said openings defines annular channels formed between superimposed ring elements building up said vessel.

7. The device of claim 1, wherein said openings are inclined in a direction of discharging said foodstuff.

8. The device of claim 1, wherein said openings are present up to approximately half of the height of said vessel.

9. A method for puffing foodstuff, comprising the steps of:
   placing foodstuff in an upright puffing reactor having a vessel, a wall of said vessel provided with a plurality of openings distributed over a lower section of its periphery, said vessel having no openings in an upper section thereof;
   supplying a first pressurized heat-carrying agent into a chamber surrounding said vessel at a first pressure, said agent flowing from said chamber via said plurality of openings, to thereby uniformly distribute said agent through the foodstuff;
   supplying a second agent to said upper section of said vessel, said upper section being substantially devoid of said product, said second agent being supplied at a second pressure higher that said first pressure; and
   opening said vessel at a lower end thereof to expel said foodstuff to effect puffing of said foodstuff;
   wherein said second agent is supplied before said vessel is opened by an opening mechanism disposed at a lower end of said vessel.

10. The method of claim 1, wherein said second agent at said second higher pressure is supplied into said chamber surrounding said vessel as well.

11. The method of claim 9, wherein said vessel is heated from outside thereof.

* * * * *

UNITED STATES PATENT AND TRADEMARK OFFICE
CERTIFICATE OF CORRECTION

PATENT NO. : 6,042,860
DATED : March 28, 2000
INVENTOR(S) : Rudolf Bichsel

It is certified that error appears in the above-identified patent and that said Letters Patent is hereby corrected as shown below:

On the Title Page, add section entitled --Foreign Application Priority Data--,
--Oct. 6, 1995 [DE] Germany 195 21 243.6--, and
--Oct. 6, 1995 [DE] Germany 195 21 168.5--.

On the Title Page, in the Abstract, line 1,
after "puffing", insert --products such as--.

Column 8, line 32, claim 6,
"defines" should be --define--.

Signed and Sealed this

Tenth Day of April, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO.    : 6,042,860
DATED         : March 28, 2000
INVENTOR(S)  : Rudolf Bichsel It is certified that error appears in the above-identified patent and that said Letters Patent is hereby corrected as shown below:

<u>Title page,</u>
Item [30], Foreign Application Priority Data, (as in Certificate of Correction issued April 10, 2001) "October 6, 1995 [DE] Germany 195 21 243.6" should be
-- June 10, 1995 [DE] Germany 195 21 243.6 --.
"October 6, 1995 [DE] Germany 195 21 168.5" (as in Certificate of Correction issued April 10, 2001) should be -- June 10, 1995 [DE] Germany 195 21 168.5 --.

Signed and Sealed this

Twenty-fifth Day of February, 2003

JAMES E. ROGAN
*Director of the United States Patent and Trademark Office*